(12) United States Patent
Leininger

(10) Patent No.: US 11,791,692 B2
(45) Date of Patent: Oct. 17, 2023

(54) RECIRCULATING LINEAR GENERATOR

(71) Applicant: Trinity Engine Generator, LLC, Jackson Center, OH (US)

(72) Inventor: Kent E. Leininger, Jackson Center, OH (US)

(73) Assignee: Trinity Engine Generator, LLC, Jackson Center, OH (US)

( * ) Notice: Subject to any disclaimer, the term of this patent is extended or adjusted under 35 U.S.C. 154(b) by 0 days.

(21) Appl. No.: 17/852,706

(22) Filed: Jun. 29, 2022

(65) Prior Publication Data

US 2022/0416621 A1 Dec. 29, 2022

Related U.S. Application Data

(60) Provisional application No. 63/216,025, filed on Jun. 29, 2021.

(51) Int. Cl.
| | |
|---|---|
| H02K 7/18 | (2006.01) |
| H02K 11/04 | (2016.01) |
| H02K 11/00 | (2016.01) |
| H02K 7/10 | (2006.01) |

(52) U.S. Cl.
CPC ......... H02K 7/1876 (2013.01); H02K 7/1004 (2013.01); H02K 11/0094 (2013.01); H02K 11/04 (2013.01)

(58) Field of Classification Search
CPC ...... H02K 7/1853; H02K 7/1869; H02K 7/18; H02K 7/1876; H02K 7/1004; H02K 11/0094; H02K 11/04; H02K 41/031; H02K 7/1884; H02K 7/1892; H02K 7/10

USPC .......... 310/67 A, 75 C, 102 R, 113, 171, 17
See application file for complete search history.

(56) References Cited

U.S. PATENT DOCUMENTS

| | | | |
|---|---|---|---|
| 4,803,387 A * | 2/1989 | Seider .................. | H02K 41/031 310/12.32 |
| 11,587,740 B2 * | 2/2023 | Macaluso ................ | B60K 6/28 |
| 2011/0115231 A1 * | 5/2011 | Mulye .................. | F03B 17/064 290/54 |
| 2012/0248774 A1 * | 10/2012 | Stewart .................. | F03B 11/00 60/501 |
| 2013/0187387 A1 * | 7/2013 | Gilchrist ............... | F03B 17/066 290/54 |
| 2016/0290317 A1 * | 10/2016 | Davison .................. | F03B 17/06 |
| 2017/0198401 A1 * | 7/2017 | Phillips .................. | H02K 35/02 |
| 2019/0101099 A1 * | 4/2019 | Lumley .................... | F03D 9/25 |
| 2020/0412200 A1 * | 12/2020 | Vaisenberg ............ | H02K 47/02 |

(Continued)

*Primary Examiner* — Ahmed Elnakib
(74) *Attorney, Agent, or Firm* — Thomas E. Lees, LLC

(57) ABSTRACT

A recirculating linear generator comprises a motor, a pulley system, two series of coil structures each arranged coaxially, a positive lead, and a negative lead. The pulley system includes a driver pulley driven by the motor and a take-up pulley. A belt couples to the driver pulley and the take-up pulley, so when driven, the belt travels along the driver pulley and the take-up pulley rotates. A series of ferromagnetic couple to the belt. The belt and masses traverse through a center (i.e., an axis) of the first series and second series of coil structures, and the first series and second series of coil structures each comprise a single electrical path. The positive lead couples to positive ends of the first and second series of coil structures, and the negative lead couples to negative ends of the first and second series of coil structures.

20 Claims, 3 Drawing Sheets

(56) References Cited

U.S. PATENT DOCUMENTS

2022/0416621 A1\* 12/2022 Leininger .............. H02K 11/04
2023/0039298 A1\* 2/2023 Keppner ................... B66B 9/02

\* cited by examiner

RECIRCULATING LINEAR GENERATOR

CROSS REFERENCE TO RELATED APPLICATIONS

This application claims the benefit of U.S. Provisional Application Ser. No. 63/216,025, filed Jun. 29, 2021, entitled RECIRCULATING LINEAR GENERATOR, by Kent E. Leininger, the disclosure of which is hereby incorporated by reference.

BACKGROUND

Various aspects of the present invention relate generally to power generation and more specifically to a linear power generator with a battery.

When a magnet moves in relation to an electromagnetic coil, a change in magnetic flux passing through the coil induces an electric current, which can be used to do work. A linear generator is most commonly used to convert back-and-forth motion directly into electrical energy. This short-cut eliminates the need for a crank or linkage that would otherwise be required to convert a reciprocating motion to a rotary motion in order to drive a rotary generator. For example, a flashlight may include a magnet in the handle that traverses the handle when shaken. The magnet induces a current in coils in the handle that charge a battery for the flashlight to work.

BRIEF SUMMARY

According to aspects of the present invention, a recirculating linear generator comprises a motor, a pulley system, two series of coil structures each arranged coaxially, a positive lead, and a negative lead. The pulley system includes a driver pulley driven by the motor and a take-up pulley. A belt couples to the driver pulley and the take-up pulley, so when driven, the belt travels along the driver pulley and the take-up pulley rotates. A series of ferromagnetic masses couple to the belt. The belt and masses traverse through a center (i.e., an axis) of the first series and second series of coil structures, and the first series and second series of coil structures each comprise a single electrical path. The positive lead couples to positive ends of the first and second series of coil structures, and the negative lead couples to negative ends of the first and second series of coil structures.

DETAILED DESCRIPTION

As discussed herein, a recirculating linear generator converts power from one source to electric power to be used, stored in a battery, or both.

Figure 1:
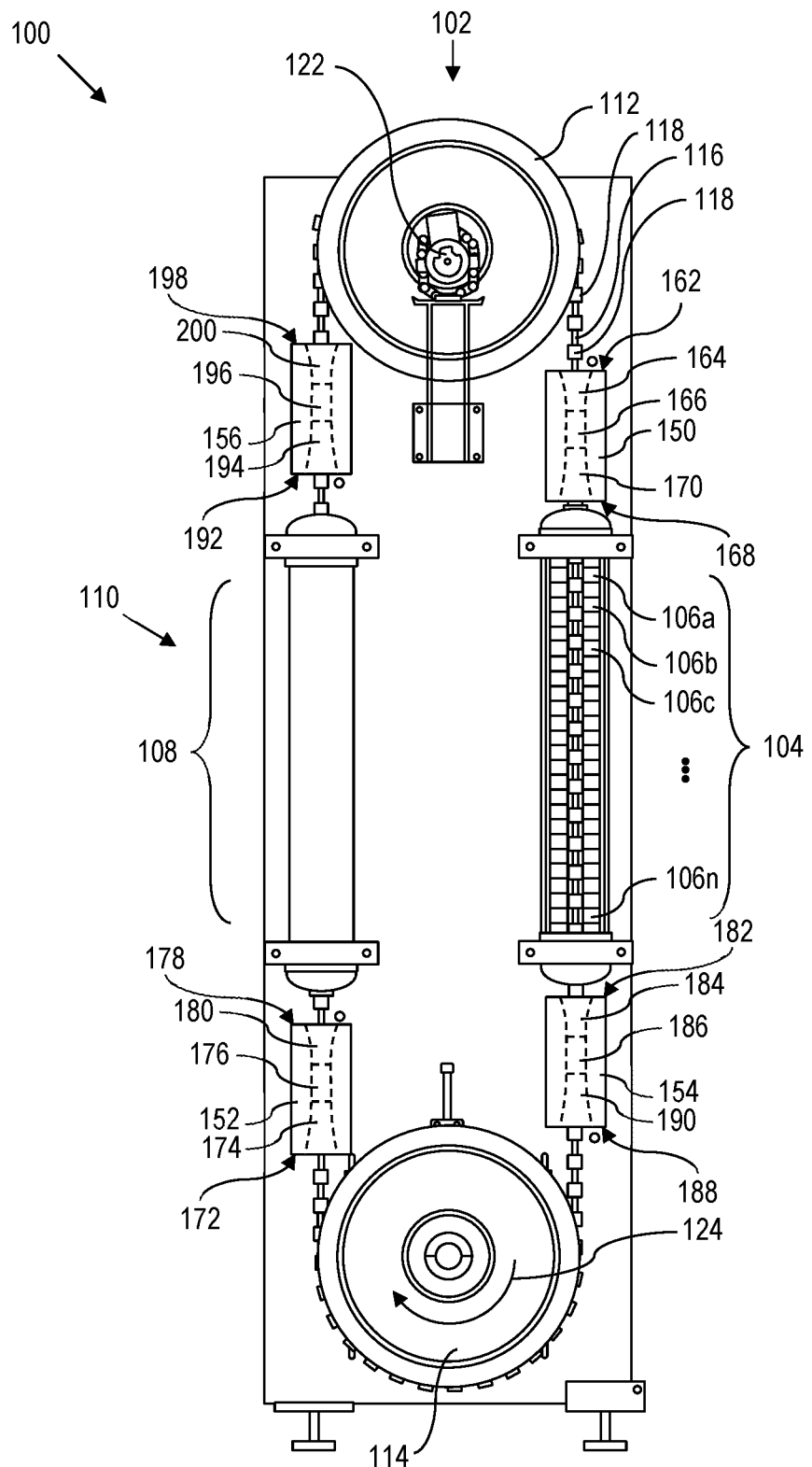
FIG. 1 is a schematic of a recirculating linear generator according to various aspects of the present disclosure.

Referring now to FIG. 1, a schematic of an embodiment of a recirculating linear generator 100 is shown. The recirculating linear generator 100 includes a vertical pulley system 102, a first series 104 of individual coil structures 106a-n (collectively, 106) arranged coaxially, and a second series 108 of individual coil structures 110 arranged coaxially. The vertical pulley system 102 includes a driver pulley 112, a take-up pulley 114, a belt 116 coupled to the driver pulley 112 and the take-up pulley 114 such that when the driver pulley 112 rotates, the belt 116 traverses along the driver pulley 112 and causes the take-up pulley 114 to rotate. The belt 116 is a loop and may be any structure that allows the gears to grip and interact with the belt 116. For example, the belt 116 can be a cable, a chain, an actual belt. Further, the belt 116 may be any material, but non-ferromagnetic materials (e.g., polyester-reinforced urethane) are preferred. As shown in FIG. 1, the driver pulley 112 is above the take-up pulley 114; however, the driver pulley 112 may be below the take-up pulley 114 in alternate embodiments. In many embodiments, the pulley system 102 is not vertical. In various embodiments, the pulleys 112 and 114 are weighted around circumferences of the pulleys to function as a flywheel when no power is driving the linear generator 100.

A series of ferromagnetic masses 118 (for clarity in the figures, not all of the masses (or multiples of other objects) are labeled) are coupled to the belt 116. An outer radius of the ferromagnetic masses 118 is equal to or smaller than an inner radius of the coil structures 110, so the masses 118 can fit through a center of the coil structures 110. Moreover, it is desired that any gap between the ferromagnetic masses and the inner radius of the coil structures be minimized. Further, the outer radius of the ferromagnetic masses 118 are not required to be equal to each other. Further, a length of each ferromagnetic mass 118 should be about a length of each coil structure 110.

In some embodiments, the ferromagnetic masses 118 are permanent magnets (e.g., neodymium). Further, in numerous embodiments, the masses 118 are of equal mass to help ensure balancing of the recirculating linear generator 100, which should reduce torque on the drive pulley 112.

The belt 116 is disposed through the coil structures 106, 110 such that the masses 118 run through the center of the coil structures 106, 110 when the driver pulley 112 rotates. In some embodiments, a motor 122 is coupled to the driver pulley 112 to cause the driver pulley 112 to rotate, which in turn causes the belt 116 to traverse (see arrow 124) around the pulleys 112, 114. The motor 122 can be electric, gas powered, etc. In other embodiments, other means may be used to cause the driver pulley 112 to rotate (e.g., pedals, crank, etc.).

When the ferromagnetic masses 118 traverse through the coil structures 106, 110, a current is induced, according to Faraday's law. The first series 104 of coil structures 106 creates a single electrical path for the induced current in each of the coil structures 106. Likewise, the second series 108 of coil structures 110 creates a single electrical path for the induced current in each of the coil structures 110. Thus, the first series 104 and the second series 108 are coupled in parallel such that there is a positive lead coupled to positive ends of the first series 104 and the second series 108, and a negative lead coupled to negative ends of the first series 104 and the second series 108. In some embodiments, the positive lead and the negative lead couple to an alternating-current-to-direct-current (AC-to-DC) converter (e.g., a full-wave rectifier, a half-wave rectifier, application-specific integrated circuit, etc.) to supply power externally (e.g., to a grid for use, to a battery for storage, etc.). In several embodiments, the positive lead and the negative lead each include a coupler for coupling to a battery.

Several variables affect the amount of current produced including: a number of coils of the coil structures 106, 110, a type of ferromagnetic mass 118 used, and a rate at which the masses 118 move through the coils. In the embodiment of FIG. 1, there are ninety-eight total masses 118. The shape of the masses 118 may be spherical, ovoid, cylindrical, etc., as long as the masses can fit through the center of the coil structures.

Each of the coil structures 106, 110 in the first and second series 104, 108 are spaced evenly apart (e.g., 2.5 centimeters) in their respective series. However, it may be larger or smaller in other embodiments. Moreover, each coil structure 106, 110 may have any number of coils, and they all do not need to be the same number of coils. For example, each coil structure may include one hundred coils. As mentioned above, the number of coils will affect the amount of current generated. The coils may be made of any conductor (e.g., copper, gold, alloys, etc.). Further, in some embodiments, the coil structures 106 of a series 104 are all coiled in the same direction (e.g., clockwise). In these embodiments, if the masses 118 are magnets, then the magnets should also be coupled to the belt 116 in the same direction (e.g., north sides all facing the same direction such that the north side of one magnet faces the south side of the subsequent magnet).

In other embodiments, sequential coils may be alternately wound (i.e., every other one) in opposing directions such that they create opposing magnetic fields. For example, coil 106a is coiled clockwise, coil 106b is coiled counterclockwise, coil 106c is coiled clockwise, etc. In these embodiments, if the masses 118 are magnets, then the magnets should also be coupled to the belt 116 in opposing directions (i.e., north side of one magnet faces the north side of the next magnet—i.e., the magnets alternate in polarity). In some cases, an alternating coil direction was shown to provide more power than a consistent coil direction (all coils of a series 104 wound in the same direction).

As the masses traverse through the pulley system 102, a side-to-side or other non-linear motion may occur. This non-linear motion usually can occur between the pulleys and the series of coil structures. To reduce the non-linear motion, up to four bushings 150, 152, 154, and 156 have been added to the recirculating linear generator 100. Embodiments of the recirculating linear generator include anywhere from zero to four bushings. Each bushing has a similar structure: an entrance side 162, 172, 182, 192 with a funnel 164, 174, 184, 194 that on the entrance side has a larger diameter that gradually reduces to a smaller radius. Further, the bushings each have a passage 166, 176, 186, 196 coupled between the funnel 164, 174, 184, 194 and an exit side 168, 178, 188, 198. The belt (and thus the masses) enter the bushing through the entrance side and exit through the exit side. The passage may be any length (including zero), but should include a radius that is approximately the size of the inner radius of the coil structures, the size of the radius of the ferromagnetic masses, or both. In some embodiments, there is a reversed funnel 170, 180, 190, 200 between the passage and the exit side.

Figure 2:
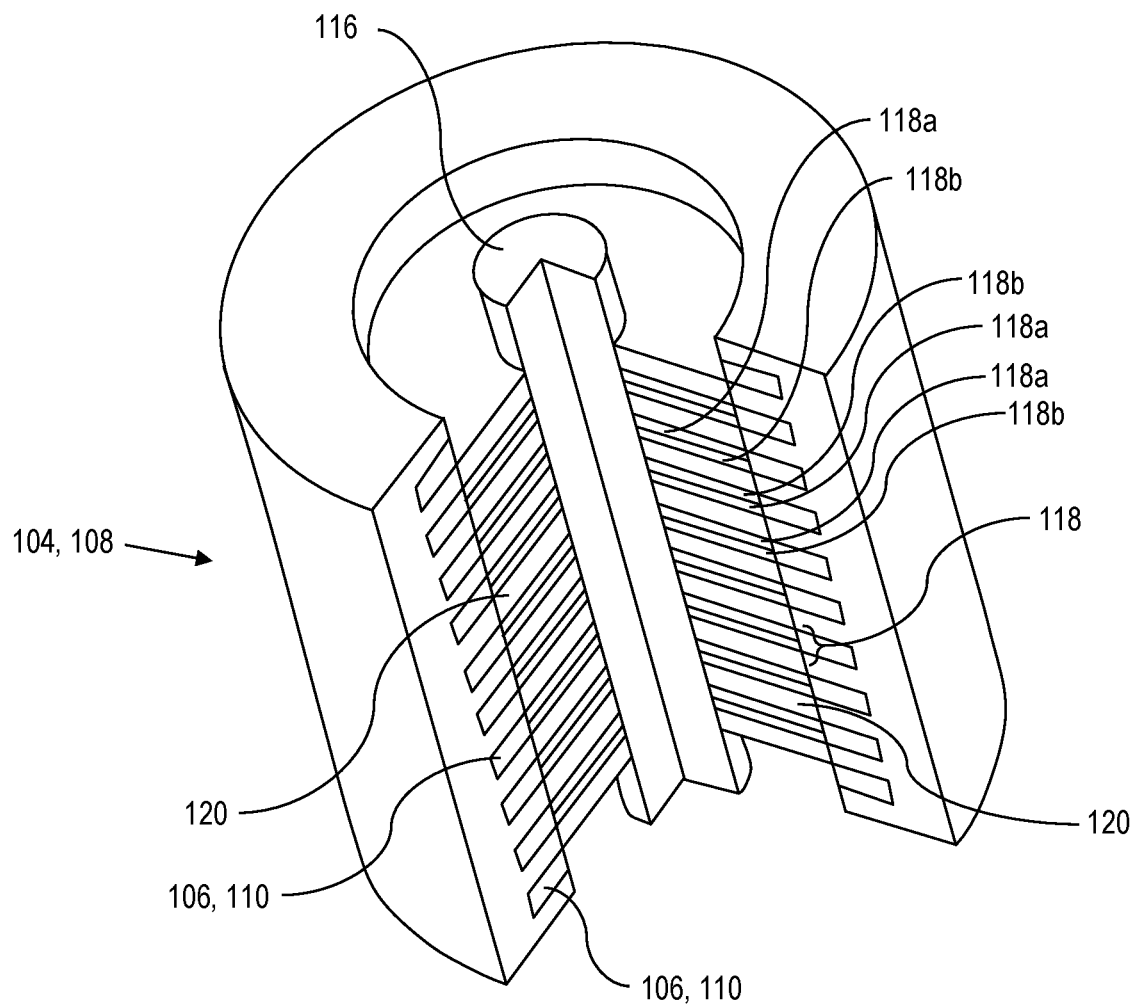
FIG. 2 is a ninety degree cutout view of ferromagnetic masses passing through a series of coil structures of the recirculating linear generator, where the ferromagnetic masses are axially magnetized, according to aspects of the present disclosure.
Figure 3:
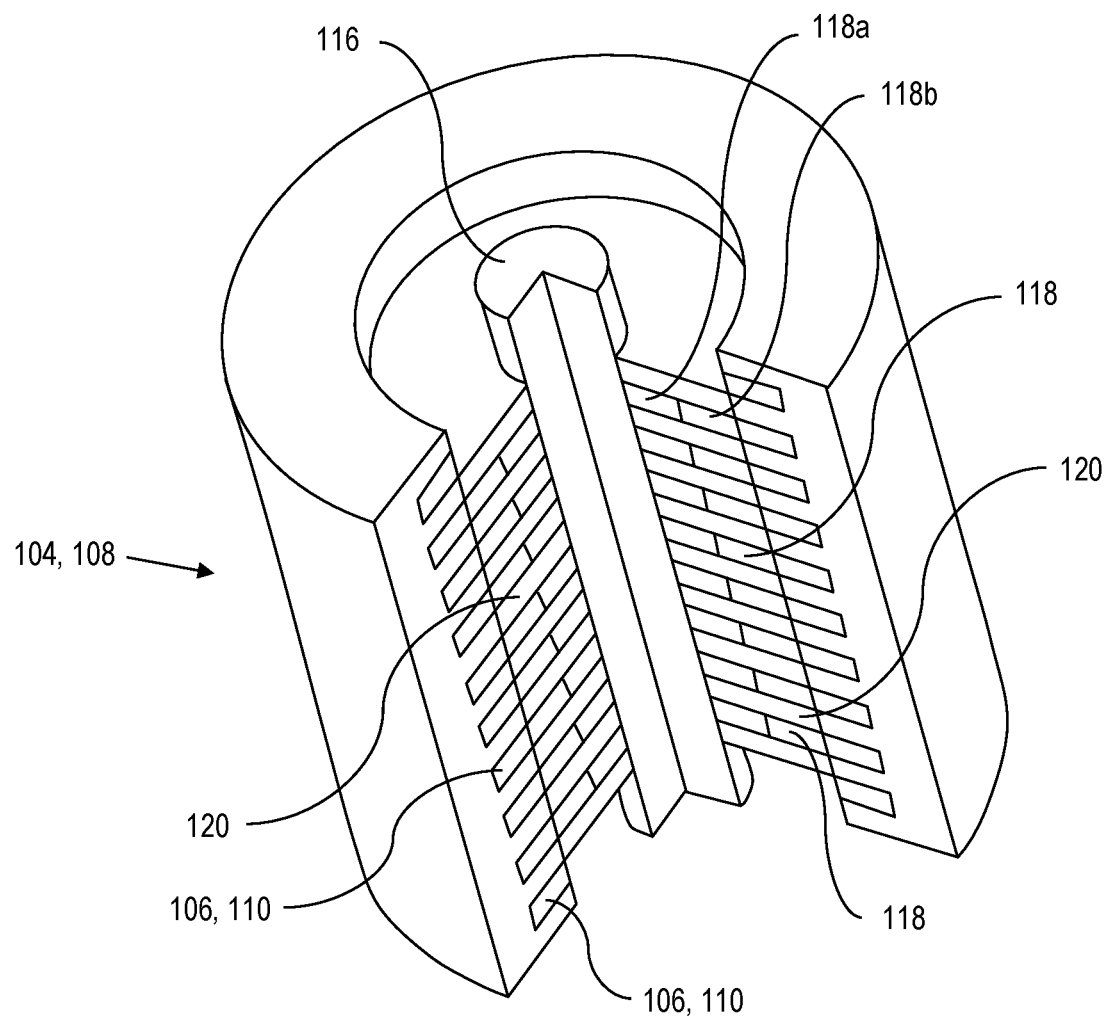
FIG. 3 is a ninety degree cutout view of ferromagnetic masses passing through a series of coil structures of the recirculating linear generator, where the ferromagnetic masses are radially magnetized, according to aspects of the present disclosure.

FIGS. 2 and 3 illustrates a ninety-degree cutout view of the series of ferromagnetic masses 118 as the masses go through the series of coil structures 106, 110. As discussed above, for clarity in the figures, multiples of the same object are not all labeled. As shown in FIGS. 2-3, there are ten coil structures 106, 110 spaced evenly. However, more or less coil structures may be used. Further, in FIGS. 2-3, only eight ferromagnetic masses 118 are shown, but it should be understood that more masses are used in the system, as the masses 118 should be coupled to the belt 116 throughout the entirety of the belt 116, as shown in FIG. 1. As shown in FIG. 2, an orientation of the ferromagnetic masses includes an axially magnetized pole structure where a north pole 118a is on a top or bottom of the masses, and a south pole 118b is opposite the north pole 118a. Moreover, in many embodiments with axially magnetized magnets as the ferromagnetic masses, alternating magnets are reversed such that a north pole 118a of one magnet faces a north pole 118a of a subsequent magnet while the south pole 118b faces the south pole 118b of a previous magnet. As shown in FIG. 3, an orientation of the ferromagnetic masses includes a north pole (118a) closer to the belt 116 and a south pole (118b) further from the belt 116 (i.e., they are radially magnetized). Further, there are spaces 120 between the ferromagnetic masses 118 coupled to the belt 116. In some embodiments, the spaces 120 may be physical devices while in other embodiments, the spaces 120 are just open air.

As discussed above, a source (e.g., motor, crank, etc.) drives the drive pulley, causing the belt with the masses to traverse through the coil structures to induce a current on the coil structures, which can then be used to power other electronics. In cases where AC is desired, the recirculating linear generator 100 may be run at a speed which ensures a 60-Hertz output with a number of coils and type of ferromagnetic mass to supply one-hundred-twenty Volts. In cases where DC is desired, an AC-to-DC converter may be used to rectify the output of the recirculating linear generator 100. Thus, energy may be supplied through the source (mechanical energy, electrical energy, etc.) and converted to a desired electrical output to power electronics, charge batteries, etc. In some embodiments, a battery is charged during operation and then energy from the battery is used to power the source (e.g., the motor 122) when no outside power/energy is available. In some embodiments, two batteries are present and are charged at alternating times (e.g., a first battery is charged, then a second battery is charged while the first battery is used to power devices requiring electricity).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A recirculating linear generator comprising:
a motor;
a vertical pulley system comprising:
  a driver pulley coupled to the motor such that the motor operates to turn the driver pulley;
  a take-up pulley positioned below the driver pulley;
  a belt coupled to the driver pulley and the take-up pulley such that when the motor causes the driver pulley to rotate, the belt travels along the driver pulley and causes the take-up pulley to rotate;
  a series of magnetic masses coupled to the belt;
a first series of coil structures arranged coaxially, wherein:
  the belt and the magnetic masses traverse through a center of the first series of coil structures when the motor causes the driver pulley to rotate;
  the first series of coil structures comprises:
    a single electrical path with a positive end and a negative end;
    an inner radius approximately the size of the radius of the masses;
a second series of coil structures arranged coaxially, wherein:
  the belt and the magnetic masses traverse through a center of the second series of coil structures when the motor causes the driver pulley to rotate; and
  the second series of coil structures comprises:
    a single electrical path with a positive end and a negative end; and
    an inner radius approximately the size of the radius of the masses;
a first bushing disposed between the driver pulley and the first series of coil structures, wherein the first bushing comprises:
  an entrance side with a first funnel;
  a passage coupled to the first funnel; and
  an exit side with a second funnel coupled to the passage, wherein:
    the belt and the magnetic masses enter the first bushing from the entrance side and exit through the exit side, and
    the passage is sized to be substantially the same as the radius of the magnetic masses;
a second bushing disposed between the take-up pulley and the second series of coil structures, wherein the second bushing comprises:
  an entrance side with a first funnel;
  a passage coupled to the first funnel; and
  an exit side with a second funnel coupled to the passage, wherein:
    the belt and the magnetic masses enter the second busing from the entrance side and exit through the exit side, and
    the passage is sized to be substantially the same as the radius of the magnetic masses;

a positive lead coupled to the positive end of the first series of coil structures and the positive end of the second series of coil structures; and
a negative lead coupled to the negative end of the first series of coil structures and the negative end of the second series of coil structures.

2. A recirculating linear generator comprising:
a motor;
a pulley system comprising:
  a driver pulley coupled to the motor such that the motor operates to turn the driver pulley;
  a take-up pulley positioned below the driver pulley;
  a belt coupled to the driver pulley and the take-up pulley such that when the motor causes the driver pulley to rotate, the belt travels along the driver pulley and causes the take-up pulley to rotate;
  a series of ferromagnetic masses coupled to the belt; and
a first series of coil structures arranged coaxially, wherein:
  the belt and the ferromagnetic masses traverse through a center of the first series of coil structures when the motor causes the driver pulley to rotate; and
  the first series of coil structures comprises a single electrical path;
a second series of coil structures arranged coaxially, wherein:
  the belt and the ferromagnetic masses traverse through a center of the second series of coil structures when the motor causes the driver pulley to rotate; and
  the second series of coil structures comprises a single electrical path;
a first bushing disposed between the driver pulley and the first series of coil structures, wherein the first bushing comprises:
  an entrance side with a funnel;
  a passage coupled to the funnel; and
  an exit side coupled to the passage, wherein:
    the belt and the ferromagnetic masses enter the first busing from the entrance side and exit through the exit side, and
    the passage is sized to be substantially the same as the radius of the ferromagnetic masses;
a second bushing disposed between the take-up pulley and the second series of coil structures, wherein the second bushing comprises:
  an entrance side with a funnel;
  a passage coupled to the funnel; and
  an exit side coupled to the passage, wherein:
    the belt and the ferromagnetic masses enter the second busing from the entrance side and exit through the exit side, and
    the passage is sized to be substantially the same as the radius of the ferromagnetic masses;
a positive lead coupled to a positive end of the first series of coil structures and a positive end of the second series of coil structures; and
a negative lead coupled to a negative end of the first series of coil structures and a negative end of the second series of coil structures.

3. The machine of claim 2, wherein a length of each of the coil structures is equal to a length of each of the ferromagnetic masses.

4. The machine of claim 2, wherein the belt comprises a non-ferromagnetic material.

5. The machine of claim 2, wherein the ferromagnetic masses are magnets.

6. The machine of claim 5, wherein the magnets are axially magnetized.

7. The machine of claim 6, wherein the magnets alternate in polarity.

8. The machine of claim 2, wherein the first series of coil structures includes a first coil structure wound in a clockwise direction and a second coil structure wound in a counter-clockwise direction.

9. The machine of claim 2, wherein the ferromagnetic masses include neodymium.

10. The machine of claim 2, wherein the pulley system is a vertical pulley system where the take-up pulley is below the driver pulley.

11. The machine of claim 2, wherein the pulley system is a vertical pulley system where the take-up pulley is above the driver pulley.

12. The machine of claim 2, wherein an inner radius of the second series of coil structures is approximately the radius of the series of ferromagnetic masses.

13. The machine of claim 2, wherein the series of ferromagnetic masses includes ninety-eight ferromagnetic masses.

14. The machine of claim 2, wherein the coil structures of the first series of coil structures each include one-hundred coils.

15. The machine of claim 2, wherein the exit side of the first bushing further comprises a funnel.

16. The machine of claim 2, wherein the exit side of the second bushing further comprises a funnel.

17. The machine of claim 2 further comprising:
a third bushing disposed between the second series of coil structures and the driver pulley, wherein the third bushing comprises:
an entrance side with a funnel;
a passage coupled to the funnel; and
an exit side coupled to the passage, wherein:
the belt and the magnetic masses enter the third busing from the entrance side and exit through the exit side, and
the passage is sized to be substantially the same as the radius of the ferromagnetic masses; and
a fourth bushing disposed between the first series of coil structures and the take-up pulley, wherein the fourth bushing comprises:
an entrance side with a funnel;
a passage coupled to the funnel; and
an exit side coupled to the passage, wherein:
the belt and the magnetic masses enter the fourth busing from the entrance side and exit through the exit side, and
the passage is sized to be substantially the same as the radius of the ferromagnetic masses.

18. The machine of claim 2 further comprising an alternating-current-to-direct-current (AC-to-DC) converter coupled to the positive lead and the negative lead.

19. The machine of claim 2, wherein:
the positive lead couples to a positive coupler for coupling to a positive terminal of a battery; and
the negative lead couples to a negative coupler for coupling to a negative terminal of a battery.

20. The machine of claim 2 further comprising a battery coupled to the positive lead and the negative lead.

* * * * *